United States Patent [19]

Isobe et al.

[11] Patent Number: 5,115,313
[45] Date of Patent: May 19, 1992

[54] PICTURE SIGNAL PROCESSING APPARATUS HAVING A TEMPORAL FILTER AND A PICTURE-IN-PICTURE FUNCTION

[75] Inventors: Mitsuo Isobe, Osaka; Katsumi Morita, Suita, both of Japan

[73] Assignee: Matsushita Electric Industrial Co., Ltd., Kadoma, Japan

[21] Appl. No.: 439,974

[22] Filed: Nov. 21, 1989

[30] Foreign Application Priority Data

Nov. 22, 1988 [JP] Japan .................. 63-294910

[51] Int. Cl.$^5$ .................. H04N 5/45
[52] U.S. Cl. .................. 358/183; 358/22
[58] Field of Search .................. 358/183, 22, 182

[56] References Cited

U.S. PATENT DOCUMENTS 4,907,086 3/1990 Truong .................. 358/183
4,935,815 6/1990 Ichikawa et al. .................. 358/183 X

FOREIGN PATENT DOCUMENTS 62-46386 12/1987 Japan .

OTHER PUBLICATIONS

Adrian Zoicas, et al., "Signal-Prozessor verbessert Bildqualitat", Elektronik, No. 1, 1988, Munich, pp. 61-63.

Primary Examiner—James J. Groody
Assistant Examiner—Mark R. Powell
Attorney, Agent, or Firm—Cushman, Darby & Cushman

[57] ABSTRACT

A picture signal processing apparatus of a TV set, which has a picture signal memory/processing circuit to which picture signals are inputted. This picture signal memory/processing circuit includes a frame memory and has two alternative functions. One of the functions is to apply LPF processing in a temporal domain to a high frequency signal component, and the other function is to take out and output a still picture signal from the picture signal.

4 Claims, 3 Drawing Sheets

PICTURE SIGNAL PROCESSING APPARATUS HAVING A TEMPORAL FILTER AND A PICTURE-IN-PICTURE FUNCTION

FIELD OF THE INVENTION AND RELATED ART STATEMENT

1. Field of the Invention

The present invention relates to a picture signal processing apparatus in a TV set and more particularly to a picture signal processing apparatus for displaying both images for an input picture signal and a substantially still picture signal based on the input picture signal onto a screen.

2. Description of the Related Art

In an NTSC system, a color picture signal has color sub-carriers multiplexed in frequency, and a phase of the signal recurs every four fields. In MUSE (Multiple Sub-Nyquist-Sampling Encoding) system, there exists a bandwidth compression picture signal in which a sub-sampling phase recurs every four fields. When the above-mentioned picture signal is processed in a receiver, signal processings of different types from each other are applied to a moving picture and a still picture. In a picture signal processing apparatus employing the above-mentioned processings, which is called as motion-adaptive picture control, it is necessary to detect a moving part of the input picture signal by means of correlation of frame reference data between two frames. In case where the moving part of the picture signal is detected by a differential signal between frames, motion of the picture is not always detected correctly because of processings by several filters which are used to remove the influence of the noise component mixed in the input picture signal and to remove influence of multiplexed signal components included in the input picture-signal, such as a color sub-carrier component and an aliasing component based on the bandwidth compression processing.

In view of the above, it is important to reduce deterioration of picture quality which is caused by malfunction of the motion-adaptive picture control. In order to reduce such deterioration, it is effective to use a "temporal filter" in which processing of low-frequency filter in temporal domain is carried out for high-frequency component of the input picture signal. Such a filter is employed in an interpolating unit for sub-sampling picture signal disclosed in the Japanese examined patent publication (Tokkai) Sho 62-46386.

FIG. 3 is a block diagram showing the above-mentioned temporal filter. In the figure, an input picture signal, which has been processed by the motion-adaptive picture control, is branched out into two ways. One is directly inputted to a subtracter 14, and the other is forwarded to the subtracter 14 through a LPF (Low Pass Filter) 13. Thus, low frequency signal is forwarded to an adder 17 and high frequency signal is issued from the subtracter 14. Process of low frequency filtration is applied to the high frequency signal by a frame memory 15 and an operational circuit 16. After that, the high frequency signal processed through the frame memory 15 and the operational circuit 16 and the low frequency signal forwarded from the LPF 13 are added to each other by the adder 17, thereby making an output picture signal. The operational circuit 16 is composed of an adder 16a and a minimum absolute-value selection circuit 16b. Signals before and after processing of the frame memory 15 and a mean value thereof are inputted to the minimum absolute-value selection circuit 16b. From among these three signals, a minimum absolute-value is always forwarded to the adder 17.

Since the motion-adaptive picture control is not always carried out perfectly, there is often a case that the picture signal is processed to have an undesirable signal component, such as a high frequency signal component of a moving picture part which may result in deterioration of the picture quality. Even in such case, by passing through the temporal filter, the high frequency signal component of the moving picture part is eliminated or lowered. Further, as to the still picture part, all signal components included in the input picture signal are issued in substance.

In the above-mentioned conventional related art, however, it is realized only to prevent or reduce deterioration of picture quality of the input picture signal by the temporal filter having the frame memory 15. When it is required to get both the input picture signal and its still picture signal and also to minify one of the picture signals and superimpose it on the other to thereby display two pictures on a screen, further processing is needed to the picture signal issued from the temporal filter. For that purpose, another frame memory, another low pass filter and time base compression etc. are required. As a result, there arises a problem such that scale of circuit becomes very large and manufacturing cost increases.

OBJECT AND SUMMARY OF THE INVENTION

An object of the present invention is to offer a picture signal processing apparatus which can prevent deterioration of picture quality of the input picture signal and display two pictures on a screen as a picture in picture with scale of the apparatus being substantially equivalent to the conventional apparatus.

In order to achieve the above-mentioned object, the picture signal processing apparatus of the present invention comprises:

first low pass means for selectively passing low frequency signal component from an input picture signal;

high pass means for selectively passing high frequency signal component from the input picture signal;

signal selection means for selectively forwarding one of the input picture signal and the high frequency signal component;

second low pass means which has frame delay means and applies temporal low pass processing to a signal forwarded from the signal selection means;

first composition circuit for mixing output signals of the first low pass means and the second low pass means;

mode control means for controlling the frame delay means and the signal selection means;

time base compression means for applying time base compression to an output signal of the first low pass means;

second composition circuit which mixes an output signal of the time base compression means and an output signal of the first composition circuit and forwards a picture signal and a predetermined still picture signal taken out from the picture signal.

The picture signal processing apparatus of the present invention realizes the above-mentioned object by minimum provision of parts, thereby rendering manufacturing cost low.

While the novel features of the invention are set forth particularly in the appended claims, the invention, both

DESCRIPTION OF THE PREFERRED EMBODIMENT

Hereafter, a preferred embodiment of the present invention is described with reference to the accompanying drawings.

Figure 1:
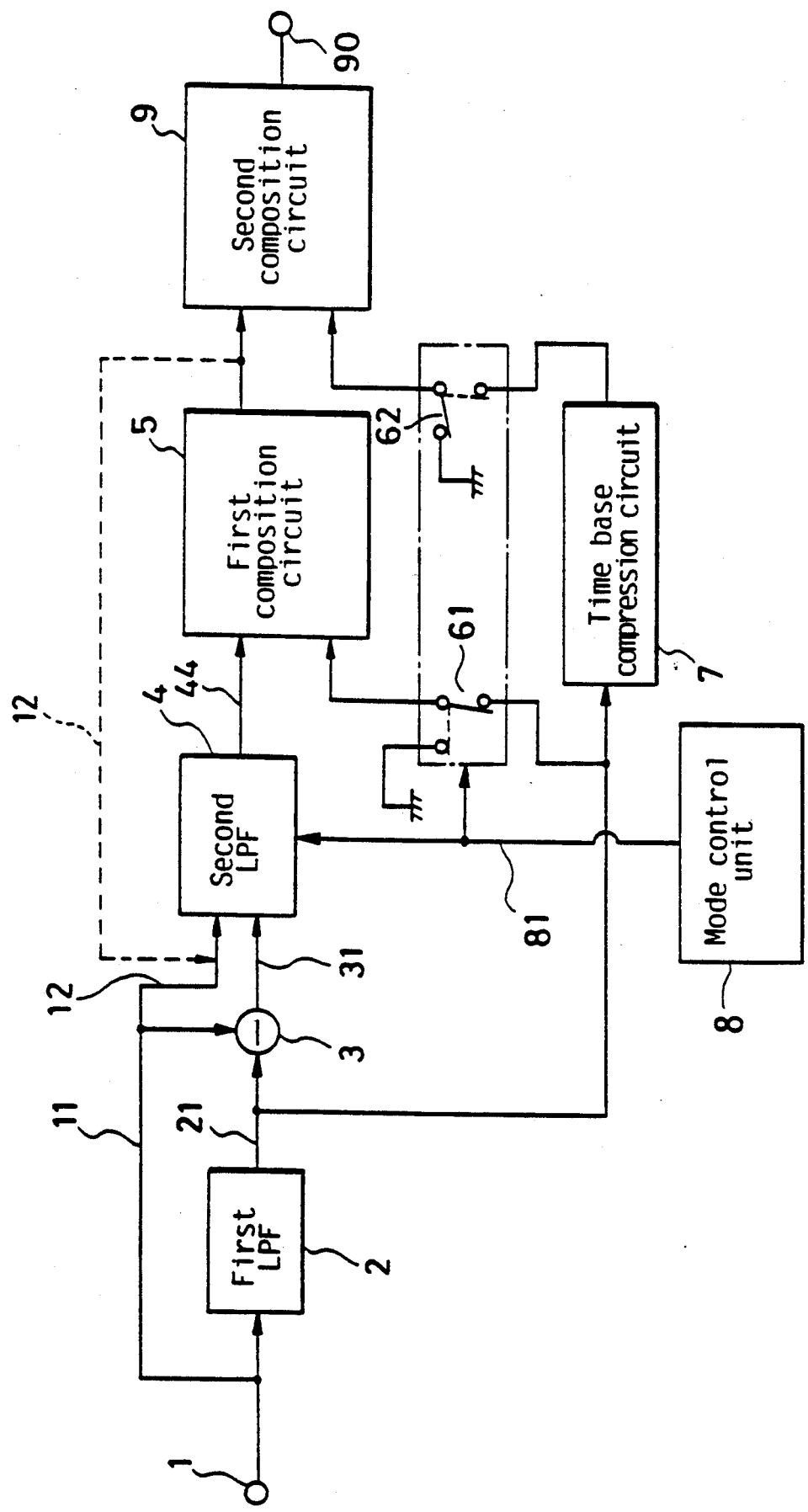
FIG. 1 is a block diagram showing a picture signal processing apparatus of the present invention.

FIG. 1 is a block diagram showing an embodiment of the present invention. In the figure, an input picture signal, which has been processed by a known motion-adaptive picture control (not shown), is supplied to a LPF (Low Pass Filter) 2 through an input terminal 1. The LPF 2 is, for example, a two-dimensional spatial LPF made by combination of a vertical LPF and a horizontal LPF. Through the LPF 2, a low frequency signal component of the input picture signal is forwarded to a line 21. Also, the input picture signal is directly forwarded to a subtracter 3 through a line 11. Therefore, the subtracter 3 acts as a high pass filter, and the high frequency signal component of the input picture signal is supplied as a first input signal to a picture signal memory/processing circuit 4 through a line 31. Further, the input picture signal is supplied as a second input signal to the picture signal memory/processing circuit through a line 12.

Figure 2:
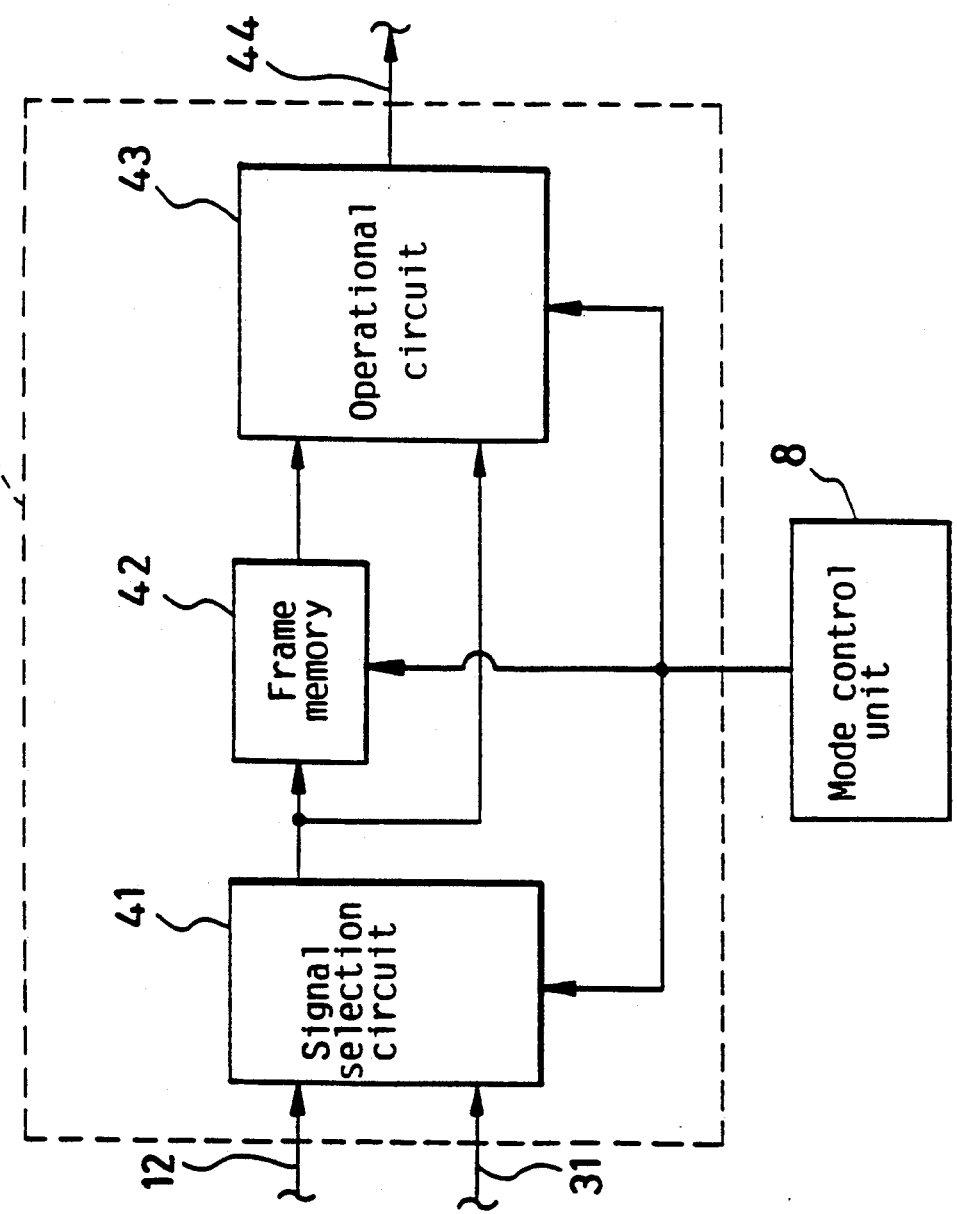
FIG. 2 is a block diagram showing a second LPF 4 of FIG. 1 in detail.

FIG. 2 is a block diagram showing the picture signal memory/processing circuit 4 in detail. In the figure, a signal selection circuit 41, which is controlled by a mode control signal supplied from a mode control unit 8, selects one of two signals inputted thereto and forwards it to a frame memory 42 and an operational circuit 43. An output signal issued from the frame memory 42 is also supplied to the operational circuit 43. When the high frequency signal component coming from the line 31 is selected by the signal selection circuit 41, the operational circuit 43 receives two signal components which have different time phases from each other. In the operational circuit 43, the two signal components are processed to add to each other or to select a minimum absolute-value among them and a mean value thereof in the same way as that carried out by the operational circuit 16 (FIG. 3) described in the conventional picture signal processing apparatus. As a result, equivalent processing of low pass filter in the temporal domain, namely processing of temporal low pass filter is carried out in accordance with the mode control signal supplied to the operational circuit 43. The frame memory 42 is also controlled by the mode control signal supplied thereto, to make time delay for one frame between an input signal and an output signal to/from the frame memory 42. When the input picture signal coming from the line 12 is selected by the signal selection circuit 41, desired one frame data of the input picture signal is stored in the frame memory, and thereafter the stored picture signal is repeatedly forwarded to the operational circuit 43. The operational circuit 43 issues only the signal, which is repeatedly supplied from the frame memory 42, onto a line 44 as a still picture signal.

In FIG. 1, when the processing of temporal LPF is carried out by the picture signal memory/processing circuit 4, the low frequency signal component, which is supplied from the LPF 2 through the line 21 and a switch 61 with its connection made as shown by a solid line, and an output signal issued from the picture signal memory/processing circuit 4 through the line 44 are mixed each other in a first composition circuit 5. When the still picture signal is issued from the picture signal memory/processing circuit 4, the forwarding of the signal from the LPF 2 to the first composition circuit 5 is broken by the switch 61 whose contact makes connection to the earth as shown by a dotted line at reception of command of the mode control signal through a line 81. A time base compression circuit 7 is provided in order to vertically and horizontally execute time base compression, thereby to make a minified sub-picture (picture in picture) signal from the picture signal supplied thereto. The sub-picture signal issued from the time base compression circuit 7 is forwarded to a second composition circuit 9 through a switch 62, whose connection is controlled by the mode control signal from the line 81. In order to substantially equalize the sub-picture signal and the input picture signal to each other in a signal bandwidth, it is preferable to vertically and horizontally thin signals of some picture element in the time base compression circuit 7 prior to execution of the time base compression. Since the high frequency signal component has already been eliminated by LPF 2, a pre-filter is not necessary before the above-mentioned thinning of signals. When the still picture signal is forwarded from the first composition circuit 5 to the second composition circuit 9 in accordance with the mode control signal, the minified sub-picture signal is forwarded from the time base compression circuit 7 to the second composition circuit 9 through the switch 62, which makes connection between the time base compression circuit 7 and the second composition circuit 9 as shown by a dotted line in accordance with the mode control signal. When the still picture signal is not forwarded to the second composition circuit 9, the forwarding of the minified sub-picture signal to the second composition circuit 9 is broken by the switch 62 whose contact makes connection to the earth as shown by a solid line in accordance with the mode control signal.

Accordingly, when the picture signal memory/processing circuit 4 acts as the temporal LPF, the input picture signal is processed to reduce its undesirable signal component which causes deterioration of picture quality, and the picture signal is finally issued from the second composition circuit 9 to an output terminal 90. Besides, when the picture signal memory/processing circuit 4 issues the still picture signal, the sub-picture signal, which is always being obtained by minifying the input picture signal, and the still picture signal are issued from the second composition circuit 9 to the output terminal 9, thereby to display a still picture and a minified sub-picture on a screen.

Figure 3:
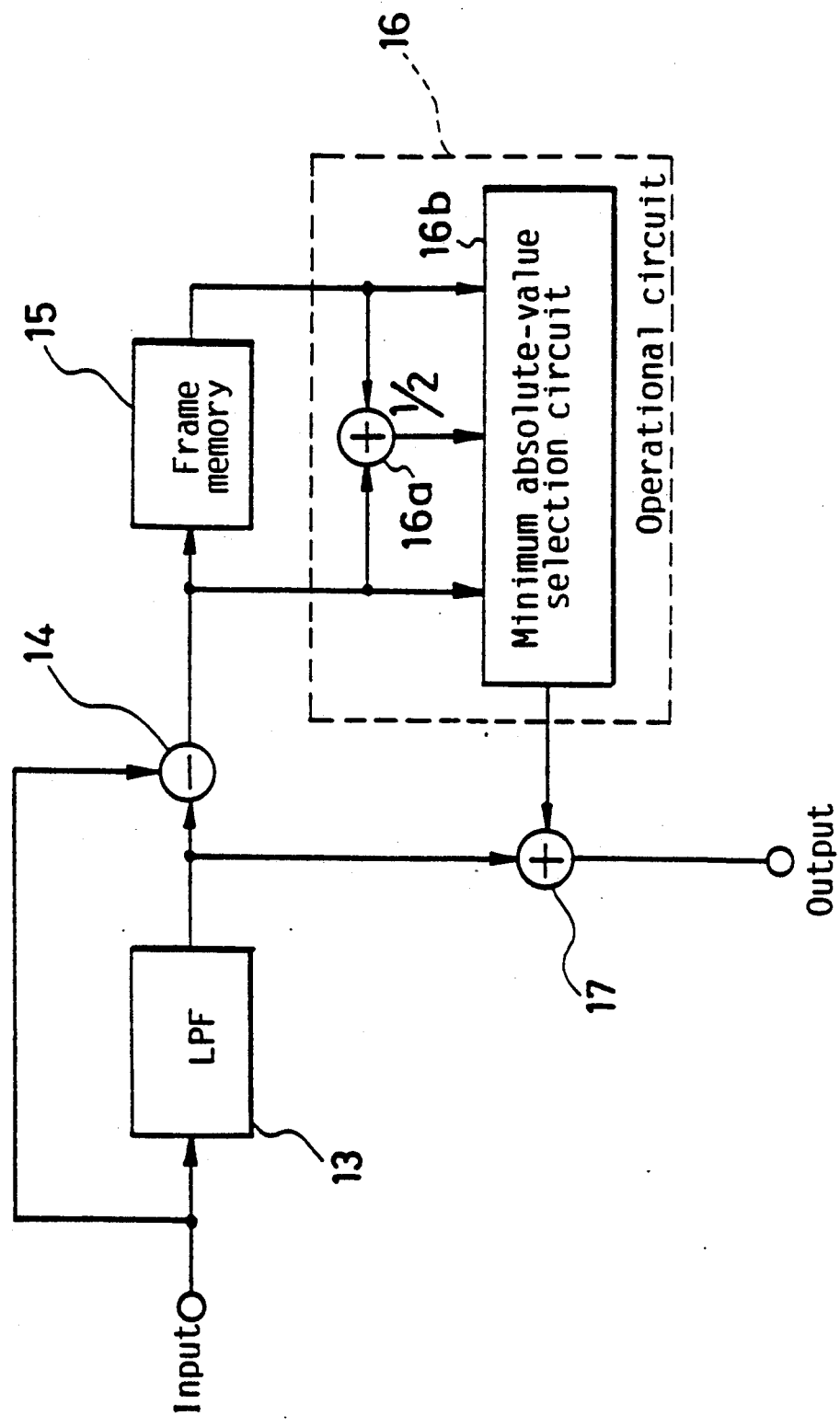
FIG. 3 is the block diagram showing the temporal filter in the interporating unit for sub-sampling picture signal as the conventional picture signal processing apparatus.

As contrasted with the conventional picture signal processing apparatus as shown in FIG. 3, the LPF 2, the frame memory 42 and the operational circuit 43 of the present invention correspond to the LPF 13, the frame memory 15 and the operational circuit 16 of the conventional apparatus, respectively. In other words, the present invention realizes both improvement of picture quality by the processing of temporal LPF and a function of picture in picture by additionally providing only the signal selection circuit 41, the time base compression circuit 7, the first composition circuit 5 and the second composition circuit 9.

In FIG. 1, in place of the connection that the input picture signal is supplied to the picture signal memory/processing circuit 4 through the line 12, the output signal of the first composition circuit 5 can be supplied through a dotted line 12'. Under this connection, change of the switch 61 is controlled so as to have a delay time of one frame against the signal selection circuit 41 (FIG. 2), thereby allotting the picture signal processed by the temporal LPF for the still picture signal. As a result, picture quality of the still picture is further improved.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A picture signal processing apparatus comprising:
   low pass means for selectively passing a low frequency signal component from an input picture signal;
   high pass means for selectively passing a high frequency signal component from said input picture signal;
   signal selection means for selectively forwarding one of said input picture signal and said high frequency signal component;
   picture signal memory/processing means, which has frame delay means, for applying temporal low pass processing to a signal forwarded from said signal selection means;
   a first composition circuit for mixing output signals of said low pass means and said picture signal memory/processing means;
   mode control means for controlling said frame delay means and said signal selection means;
   time base compression means for applying time base compression to an output signal of said low pass means;
   a second composition circuit which mixes an output signal of said time base compression means and an output signal of said first composition circuit and forwards a picture signal and a predetermined still picture signal taken out from said picture signal.

2. A picture signal processing apparatus in accordance with claim 1, wherein
   said signal forwarded from said signal selection means is inputted to said frame delay means.

3. A picture signal processing apparatus in accordance with claim 2, further comprising
   switch means for breaking forwarding of signal from said low pass means to said first composition circuit upon selection of said input picture signal by said signal selection means.

4. A picture signal processing apparatus in accordance with claim 1, wherein
   said signal selection means selects one of said high frequency signal component and an output signal of said first composition circuit, to supply it to said frame delay means, and
   said second composition circuit mixes said input picture signal and an output signal of said time base compression circuit upon selection of said output signal of the first composition circuit by said signal selection means.

* * * * *